United States Patent
Keppens (10) Patent No.: US 11,352,097 B2
(45) Date of Patent: Jun. 7, 2022

(54) HYBRID POWERTRAIN FOR A PEDAL VEHICLE, CONTROL UNIT THEREFOR, PEDAL VEHICLE

(71) Applicant: intuEdrive BV, Kampenhout (BE)

(72) Inventor: Tomas Bernhard Guy Keppens, Kampenhout (BE)

(73) Assignee: INTUEDRIVE BV, Kampenhout (BE)

( * ) Notice: Subject to any disclaimer, the term of this patent is extended or adjusted under 35 U.S.C. 154(b) by 325 days.

(21) Appl. No.: 16/471,806

(22) PCT Filed: Dec. 23, 2016

(86) PCT No.: PCT/EP2016/082582
§ 371 (c)(1),
(2) Date: Jun. 20, 2019

(87) PCT Pub. No.: WO2018/113998
PCT Pub. Date: Jun. 28, 2018

(65) Prior Publication Data
US 2020/0115003 A1  Apr. 16, 2020

(51) Int. Cl.
*B62M 6/50* (2010.01)
*B60L 7/10* (2006.01)
(Continued)

(52) U.S. Cl.
CPC ............. *B62M 6/50* (2013.01); *B60L 7/10* (2013.01); *B62J 99/00* (2013.01); *B62M 6/60* (2013.01);
(Continued)

(58) Field of Classification Search
CPC . B62M 6/50; B62M 6/60; B62M 6/90; B62M 11/14; B62M 6/65; B62M 11/16;
(Continued)

(56) References Cited

U.S. PATENT DOCUMENTS

| 5,242,335 A | 9/1993 | Kutter |
| 6,446,745 B1 | 9/2002 | Lee et al. |

(Continued)

FOREIGN PATENT DOCUMENTS

| DE | 102009054480 A1 | 6/2011 |
| EP | 1642820 A1 | 4/2006 |

(Continued)

OTHER PUBLICATIONS

Office Action from corresponding European Application No. 16822183.6, dated May 4, 2021.
(Continued)

*Primary Examiner* — Jacob D Knutson
*Assistant Examiner* — Marlon A Arce
(74) *Attorney, Agent, or Firm* — Workman Nydegger (57) ABSTRACT

A powertrain for a pedal vehicle, such as a bicycle, which powertrain comprises a first and a second electric motor and a planetary gear set comprising a sun gear, a ring gear and a planet carrier, wherein the sun gear is connected to the first motor, the ring gear is connected to the crank axle receiving the user input, and the planet carrier is connected to an output of the powertrain for transmitting power to at least one output element, such as a wheel, of the vehicle, wherein the second motor is directly connected to the output of the powertrain.

14 Claims, 5 Drawing Sheets

(51) Int. Cl.
*B62J 99/00* (2020.01)
*B62M 6/60* (2010.01)
*B62M 6/90* (2010.01)
*B62M 11/14* (2006.01)
*B62J 45/20* (2020.01)

(52) U.S. Cl.
CPC .............. *B62M 6/90* (2013.01); *B62M 11/14* (2013.01); *B60L 2200/12* (2013.01); *B62J 45/20* (2020.02)

(58) Field of Classification Search
CPC .......... B62M 11/18; B62M 6/55; B62M 6/45; B60L 7/10; B60L 2200/12; B62J 99/00; B62J 45/20
See application file for complete search history.

(56) References Cited

U.S. PATENT DOCUMENTS

| | | | |
|---|---|---|---|
| 9,254,890 B2 | 2/2016 | Deleval | |
| 2002/0148656 A1* | 10/2002 | Li | B62M 6/45 180/6.2 |
| 2009/0305831 A1* | 12/2009 | Moeller | B66D 1/22 475/5 |
| 2010/0300789 A1* | 12/2010 | Reyes | B62M 23/00 180/206.7 |
| 2011/0034283 A1* | 2/2011 | Tsai | B62M 6/65 475/149 |
| 2015/0122565 A1* | 5/2015 | Deleval | B62M 6/50 180/206.3 |
| 2015/0136509 A1* | 5/2015 | Tanaka | B62M 6/60 180/206.3 |
| 2015/0266542 A1* | 9/2015 | Marioni | H02K 21/02 180/62 |
| 2016/0221445 A1* | 8/2016 | Tanaka | B60L 3/12 |
| 2017/0137088 A1* | 5/2017 | Watarai | B62M 11/02 |
| 2017/0219066 A1* | 8/2017 | Yamamoto | B62M 6/55 |
| 2017/0259883 A1 | 9/2017 | Yamamoto | |
| 2017/0274963 A1* | 9/2017 | Yamamoto | B62M 11/14 |

FOREIGN PATENT DOCUMENTS

| | | |
|---|---|---|
| JP | 2016113116 A | 6/2016 |
| WO | 2010092331 A1 | 8/2010 |
| WO | 2011019715 A1 | 2/2011 |
| WO | 2013160477 A1 | 10/2013 |
| WO | 2015128818 A1 | 9/2015 |
| WO | 2016034574 A1 | 3/2016 |
| WO | 2017129275 A1 | 8/2017 |

OTHER PUBLICATIONS

International Search Report and Written Opinion from PCT Application No. PCT/EP2016/082582, dated Mar. 7, 2017.
International Preliminary Report on Patentability from PCT Application No. PCT/EP2016/082582, dated Apr. 1, 2019.
Written Opinion from PCT Application No. PCT/EP2016/082582, dated Nov. 14, 2018.
Office Action from corresponding European Application No. 16822183.6, dated Mar. 17, 2022.

* cited by examiner

HYBRID POWERTRAIN FOR A PEDAL VEHICLE, CONTROL UNIT THEREFOR, PEDAL VEHICLE

BACKGROUND

The invention relates to a hybrid powertrain for a pedal vehicle, for example a bicycle, comprising at least one electric motor.

An hybrid powertrain for a pedal vehicle, such as a bicycle, typically may comprise one or two electric motors, i.e. not including or including a power split device, a planetary gear set that connects to at least one wheel as output. The motors can be fed by a battery, and can provide pedal assistance to the user, such as a cyclist, when pedaling. Typically the hybrid powertrains are used in bicycles with electric assistance. These bicycles are different from an electric motorcycle in that the electric assistance mainly takes place when the cyclist is pedaling.

Various hybrid powertrains for electric assisted pedal vehicles are known. For example, publication U.S. Pat. No. 5,242,335 describes a planetary gear train for a hybrid-drive vehicle employing muscle power and an auxiliary motor. The motor drives the sun wheel and the cyclist acts on the ring gear via a derailleur gear. The assistance level to the cyclist is fixed at each speed. Therefore, the derailleur gear is required to adjust the motor assistance level at a given speed. Furthermore a freewheel is required to allow the cyclist to change gears. A drawback of this system is its complexity and high maintenance.

Publication WO 2010/092331 describes a power split transmission for a bicycle including an input constituted by a bicycle crankshaft, a three branch epicyclic gear set and first and second motor/generators. The first motor is connected to the sun gear, the second motor to the ring gear, which is also connected to the vehicle load. The user exerts his input on the planet carrier. The motor/generators are connected together to control the electrical power transferred between the two motor/generators. A drawback of this system is the reduced efficiency due to the serial losses of the connected motor/generators when all branches rotate in the same direction.

Publications WO 2013/160477 and WO 2016/034574 describe a powertrain for a bicycle having a first and a second motor and an epicyclic gearing. The first motor is connected to the sun gear, the second motor and the crank axle are connected to the ring gear, and the planet carrier is connected to the output chain ring. This results in a rather complex powertrain in which external toothing on the ring gear and an additional double gearwheel are used.

A drawback of these powertrains may be that the level of electric assistance is not adjustable, so that there is the need to add mechanical complexity by a gear changing mechanism to adjust the assistance level. Another drawback may be the reduced efficiency of the powertrain, e.g. due to serial losses in the powertrain. Further, in some known hybrid powertrains clutches are used. Additionally, prior art hybrid powertrains are often relatively complex and/or relatively heavy. Therefore, there is a need for an improved hybrid powertrain, in particular having a power split device, for pedal vehicles, such as bicycles. In particular, there is a need for a more simple, cost effective powertrain.

SUMMARY

Thereto, the invention provides for a powertrain for a pedal vehicle, such as a bicycle, which powertrain comprises a first and a second electric motor and a planetary gear set comprising a sun gear, a ring gear and a planet carrier, wherein the sun gear is connected to the first motor, the ring gear is connected to the crank axle receiving the user input, and the planet carrier is connected to an output of the powertrain for transmitting power to at least one output element, such as a wheel, of the vehicle, characterized in that the second motor is directly connected to the output of the powertrain.

Due to the configuration according to the invention, the first motor can operate in motor mode with all branches of the epicyclic gear spinning in a positive direction. The torques on ring gear and on sun gear act in the same direction, such that the carrier power is the sum of the positive ring gear power and the positive sun gear power, allowing the first motor to operate in motor-mode during normal use. This allows a more efficient use of the first motor. By providing the second motor directly or rigidly, i.e. without freewheel, to the output of the powertrain, it can both function as a motor and as a generator. The second motor can for example be directly coupled to the output axle of the powertrain, e.g. the chain ring, or can for example be connected via the planet carrier as output of the planetary gear set. The second motor is rigidly coupled to the output of the powertrain, i.e. without a freewheel between the output and the second motor.

Further, due to the absence of a freewheel between the cyclist input and the ring gear, the cyclist input is permanently connected to the output. The powertrain thus permanently 'feels' the cyclist input and vice versa, the cyclist permanently 'feels' the powertrain, also during coasting and braking. As such, a more intuitive use may be possible for the cyclist, as he can influence the assistance or regenerative braking level by his leg input. This effect may be similar to the one experienced with a fixed gear bicycle, often used for children when learning to ride a bicycle.

In the preferred embodiment, there is also no clutch between the ring gear and the planet carrier or between the sun gear and a housing of the powertrain. Contrary to prior art, this allows for a very low minimal gear ratio, with limited maximum power output though. To maximize delivered power during steep climbing and to guarantee smooth take-off, special control strategies have been developed for this preferred embodiment.

In this way, the full potential of the power split device to control the vehicle by only leg input in all conditions except emergency braking can be used. The installed power of first and second motor is minimized by special control strategies avoiding high peak cyclist input torque. This is contrary to prior art systems, that often do not use the full potential of a high dynamic variable gear ratio by applying a freewheel clutch between the user and his input to the power split device or a one way clutch between the pedalist input and the powertrain output or the first motor and the housing. While these clutches do not completely eliminate the risk for slipping through, they limit the total system gear ratio.

Due to the absence of a freewheel and due to the second motor being directly connected to the output of the powertrain, regeneration of brake energy is possible via the second motor and/or the first motor, to a battery connected to the first and/or second motor. The regeneration mode, possible in this layout, is not only important for improved efficiency as well as for a more intuitive use of the powertrain. This may allow the user to control also deceleration by the input of his legs. Moreover, with its torque coupled to the large vehicle inertia, second motor torque ripples may be much more dampened towards the user. Advantageously, the different ratios of the system are dimensioned in such a way that the electric first and second motors run at an optimum maximum rpm or speed, e.g. 4500 rpm under load. Moreover, the ratios are dimensioned to optimize the load distribution of the different power sources in order to increase efficiency. As the relation between the power of the user and the first motor is fixed for each vehicle speed and crank speed, an operating condition is selected in which the sum of user input and the corresponding first motor input are equal to vehicle resistance power.

Advantageously, a control unit is provided to control the power provided by the first motor and/or the second motor. Since the first motor is always connected to the sun gear of the powertrain and the cyclist input is always connected to the ring gear of the powertrain, there is no decoupling of cyclist input. So, the control unit may have at any time information, such as position, speed and/or torque, from the cyclist crank axle directly, measured and/or calculated from the speed and/or torque relations, as known in a planetary gear. As such, the control unit may provide control signals to the first and/or second motor not only during acceleration and/or cruising, but also during coasting and/or braking, based on the cyclist input, preferably based on the time history of the position and/or speed and/or torque of the crank axle. Motor braking, controlled by crank input such as position and/or speed and/or torque, may result in a far more intuitive vehicle control. Based on this input, the control signals for the first motor and the second motor can be calculated. Advantageously, the control unit is configured to determine the input of the cyclist, i.e. the crank axle torque and/or speed and/or position. The cyclist input can be estimated or may result from measurements, for example, by measuring the position and/or speed and/or torque on the crank axle. In an example, the—angular—position can be measured and based on this angular position, the speed of the crank axle, or pedal frequency of the cyclist, can be determined. The torque on the crank axle can be estimated based on the torque of the first motor and/or of the second motor, using the speed and/or torque relations of a planetary gear set. The control unit then provides a control signal for the first motor, in particular a speed control signal, and provides a control signal for the second motor, in particular a torque control signal to control speed or position of the crank and assistance level of the power train.

Further, the control unit may be configured to allow for an instant change in the gear ratio, for example by providing for an instant change in the speed of the first motor. As such, a freewheel can be simulated to the cyclist, while a physical freewheel-component is absent in the powertrain.

Since the cyclist input via the crank axle is always connected to the planetary gear set, the legs of the cyclist form in fact an interface between the first and the second motors and the control unit. The first motor is speed controlled by the control unit to provide for an optimal cranking speed or to control crank position. The second motor is torque controlled to provide for an adjustable assistance level to the user.

Due to the possibility of the control unit to estimate the cyclist input based on the information from the first motor and from the second motor, respectively speed and torque, and then further to calculate further control signals for the first motor and the second motor, a freewheel or clutch can be obviated in the powertrain. Contrary to prior art, in which a freewheel is required between the output and either one of the first and second motor. In prior art bicycles, when the freewheel is used, the contact between the cyclist and the powertrain is lost, resulting in a more difficult to control powertrain. As such, by providing a control unit that uses cyclist input as input parameter, a freewheel can be obviated such that a relatively compact and simple powertrain, with relatively less components, can be provided. Also, due to providing a control unit using the cyclist input as an input parameter for its control strategy, the control unit can provide for a more faster and/or smarter control of the powertrain.

Advantageously, contact between the powertrain and the cyclist remains, resulting in a more intuitive use of the powertrain. This may allow for a more safe operation and a more swift acceptance of the powertrain by the user. Also, since there is a connection between the crank axle input, the first and the second motors and the output, and, due to the absence of a freewheel, sensors can be obviated. Thus, no, less or limited sensors need to be used, allowing for a more robust powertrain.

The pedal vehicle can be a bicycle, for road, or land, but may also be a bicycle for water. A road or land bicycle typically has two, three or four wheels as output elements, a water bicycle may have vanes as output elements. The output axle thus may be connected to one or more wheels as output elements or to one or more vanes or any other output element to be driven. A pedal vehicle can be a regular two-wheel bicycle, or may be a handbike, or may be a tricycle or one-wheeler etc. For example, for a one-wheeler, there is a permanent contact between the pedals and the wheel, such that adding gears is not possible. In this case, in the absence of a freewheel, a variable gear ratio could be obtained while maintaining the continuous connection between crank and wheels with a powertrain according to the invention.

By providing the first motor configured to allow negative speed, a more intuitive use of the powertrain is possible. As such, a relatively low transmission ratio becomes possible, as known from conventional bicycles for, in particular, uphill riding. However, when the first motor runs with a negative speed, the first motor in fact works as a generator, thus reducing the total power output of the powertrain. Therefore, this mode is preferably used for moderate slopes when the total available power output of the powertrain is larger than the vehicle load.

For more steep slopes, alternatively and/or additionally, a climbing boost mode may be provided. In the climbing boost mode, the pedals may be kept approximately stationary by the user, while the first motor can run at maximum possible speed and the second motor may run at a relatively low speed according to the vehicle speed. As such, the total power output of the powertrain may be optimized and/or maximized. When uphill riding, the cyclist may provide limited speed input, the crank axle may even be in an approximately standstill position. In that case, the cyclist may provide a relatively high torque input, which may be continuous. The first motor may run at maximum speed, and the second motor may be controlled depending on the torque input on the crank axle to provide additional torque and/or speed to the output. The controller may target a crank position set point rather than a crank speed set point. As the user may control a constant torque continuously, rather than a periodically changing torque, a very accurate assistance for uphill climbing may be provided. Moreover, the combined system power output will be maximized for any given motor dimensions during low speed high gradient operation.

Advantageously, a battery is coupled to the first and second motor, allowing for a stand-alone application on the pedal vehicle. Due to the absence of a freewheel or a one-way clutch between the input and output of the powertrain, regenerative braking is possible, allowing brake energy, received on the output, to be charged to the battery via the second motor and/or via the first motor. This may provide for a more safe and/or efficient powertrain.

Preferably, the second motor is arranged to charge the battery with brake energy on the output axle. Due to the second motor being directly coupled to the output axle, regenerative braking becomes possible, already when the crank is kept stationary. In particular, regenerative braking becomes possible because of the absence of a freewheel or a clutch. As such, brake energy on the output axle can be transmitted via the second motor to the battery. This also allows for a more intuitive use of the powertrain by the user. The regenerative braking can be controlled by the control unit using the actual or time history of either one or more of the position, the speed and/or the torque on the crank axle. On the crank axle a position sensor may be provided that senses the angular position of the crank axle, which also can be used to determine the speed and/or acceleration of the crank axle. Using e.g. the position information of the crank axle, the brake intention of the user can be estimated, which can be used to determine how much regenerative braking is wanted.

Advantageously, the first motor is arranged to charge the battery with additional excess brake energy from the output. It may happen that more brake energy is generated than the second motor can absorb, in that case, it may be advantageous that the first motor is configured to charge the battery with the excess brake energy. Regenerative braking via the first motor may be possible when a negative torque on the crank axle, exerted by the user, is provided. The excess brake energy on the output axle can be charged to the battery via the first motor then, controlled by the actual torque applied on the crank axle. The actual torque on the crank axle may be determined based on—angular—position measurement of the crank axle and/or on the first motor torque and/or speed.

For temporary storage of the excess brake energy a super capacitor can be provided, e.g. when the charging current for the battery is not sufficient to charge the battery with the excess energy that becomes available, such as during braking on a steep downhill slope. Alternatively and/or additionally, a power resistor may be provided to dissipate excess brake energy, e.g. when the battery is fully charged. Providing a capacitor and/or a resistor may prevent damaging of the battery during maximum braking. As a freewheel or a one-way clutch is absent between the first motor and the output, such that the first motor is always connected to the output, a more intuitive use of the powertrain can be obtained, as the crank axle input can be used as an input for the control unit. As such, the crank axle, powered by a cyclist, forms an interface between the input and the output of the powertrain and an input to the control unit.

For example, the first motor and the second motor can be approximately equally dimensioned. This is contrary to prior art, in which often the second motor is dimensioned as small as possible, as—in the prior art—the second motor is coupled to the planetary gear set and the transmission ratio is determined by the first motor. By providing approximately equally dimensioned motors, this may result in lower tooling investment and/or production costs, and/or the motors may be used more efficiently. Also, in a typical speed range of the pedal vehicle, both motors can be used in a motor-mode, instead of in a generator-mode. This allows for a lower total installed power and thus a more compact transmission.

Further, the powertrain may be configured to provide a park position of the crank axle, such that, as soon as the user torque input on the pedals falls below a predefined torque threshold, the pedals can be moved to a park position. Then, braking or coasting can be detected and the pedals on the crank axle are moved to a predetermined position. During coasting of the vehicle and/or after stopping of the vehicle, a park mechanism may bring the pedals on the crank axle to a park position. This is advantageous for starting with pedaling again, e.g. when starting to move the pedals again after coasting, or when taking off of the vehicle after standstill. Such a park mechanism may be embodied as a ring in which notches are provided, e.g. in the housing of the crank axle, in which a protrusion of a corresponding ring mounted e.g. on the crank axle, may fit when the crank axle is in a predetermined position when the vehicle is stopped. Mechanisms can be provided to allow the protrusion to fit in the notch at vehicle standstill only, for example, spring biased and/or allowing axial translation of the rings with respect to each other etc. Many embodiments are possible.

Alternatively, the control unit may be configured to bring the pedals to the park position when the pedal torque input by the cyclist on the crank axle drops below a certain predefined threshold, typically, as soon as the cyclist ceases to provide pedal torque input. In this way, the pedals can not only be set at vehicle standstill, but also be brought to this park position during braking, coasting and during coming to a standstill. Contrary to the park position mode, in the climbing boost mode the cyclist may provide a torque input on the pedals that is higher than the park position threshold such that the control unit operates in climbing boost mode, instead of in the park position mode. Thereto, a position sensor on the crank axle can be provided to measure the position of the crank axle, and thus to determine when the crank axle is in the predetermined park position. Based on the speed and/or torque input from the first motor and/or the second motor and/or the crank axle, a pedal standstill mode of the vehicle can be determined. In such a standstill mode, the control unit is configured to bring the crank axle, and the pedals mounted thereto, to the park position.

Advantageously, the pedals in the park position are positioned respectively in a quadrant before a dead point of the pedal cycle. As such, when the user starts pedaling again, he moves the pedals and applies torque on the pedals. However, as the pedals are parked in a position close before the dead point in the pedal cycle, the torque the user can apply onto the pedals is rather limited. This allows, in particular the first motor during start, to run in take-off mode and build up speed. As such, once the pedals are being pushed through the dead point by the user, the first motor has sufficiently geared up to provide assistance to the user. The vehicle is then brought preferably to a minimum set speed using position or speed control for the crank axle. By providing such a park position, it can be prevented or at least limited, that the cyclist pushes strongly on the pedals and thus giving high peak torque input to get a strong initial response from the vehicle. So, by providing such a park position, taking off with the bicycle is possible before the cyclist can apply large torque input, while still receiving the direct response from the vehicle. Providing such a park position for the crank axle in which the pedals are parked in a position in a quadrant before the dead point of the pedal cycle, may prevent stalling of the motors, in particular of the first motor, during take-off. Also the planetary gear set can be dimensioned for a lighter maximum torque, thereby the planetary gear set can become smaller.

Various configurations of the first motor and the second motor can be possible. Advantageously, the second motor can be directly coupled to a non-driven hub of the pedal vehicle, e.g. the hub of the front wheel. The first motor can be coupled to the driven hub of the pedal vehicle, typically of the rear wheel. Alternative configurations may also be possible, such as both motors at the driven hub, or one of the motors at the crank axle and the other one of the motors at the driven or non-driven hub.

Further, the second motor may be provided with a switchable gear reduction. By providing the second motor with a switchable gear, this may allow for additional electric assistance to the cyclist above a certain speed and/or in uphill riding.

The powertrain is preferably dimensioned for a predetermined typical speed range of the bicycle. Advantageously, the second motor is dimensioned such that above this predetermined vehicle speed, the second motor generates positive power, and acts as a motor, and below this predetermined vehicle speed, it may act as a generator. This allows for a more efficient use and more effective assistance of both motors in the typical speed range.

The invention further relates to a pedal vehicle comprising such a powertrain.

The present invention will be further elucidated with reference to the drawings.

DETAILED DESCRIPTION OF VARIOUS EMBODIMENTS

In the drawings, the figures are given merely as a schematic representation of the invention. Corresponding elements are designated with corresponding reference signs.

Figure 1:
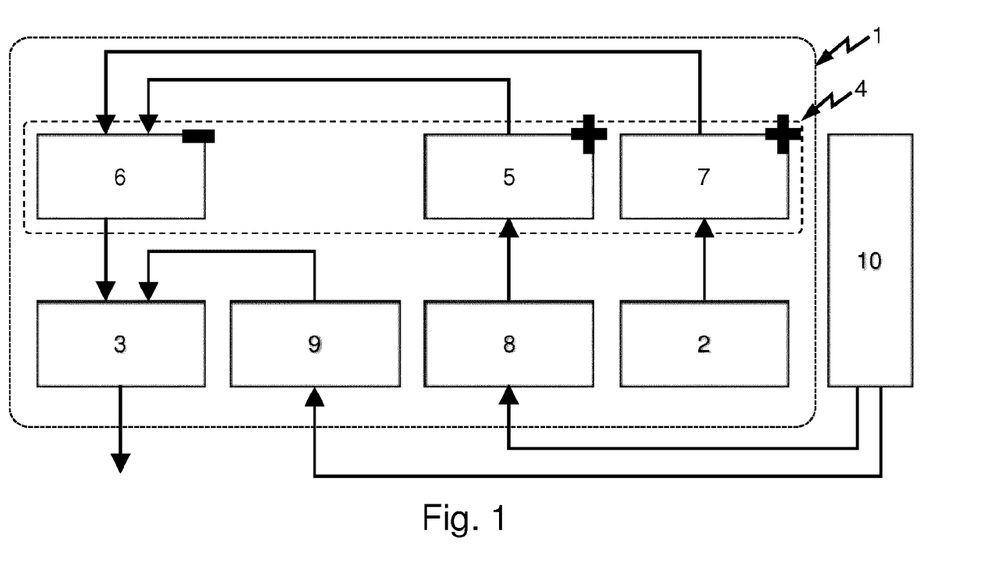
FIG. 1 shows a schematic arrangement of a powertrain according to the invention indicating power paths for drive mode.

FIG. 1 shows a schematic representation of a hybrid powertrain 1 for a pedal vehicle, such as a bicycle, according to the invention. The powertrain 1 comprises an input 2 provided by a cyclist on a crank axle, typically via pedals. The powertrain 1 further comprises an output 3 to an output axle, typically a hub of wheel of the bicycle. Further, the powertrain 1 comprises a planetary gear set 4, having a sun 5, a planet carrier 6 and a ring gear 7. Also, the powertrain 1 comprises a first motor 8 and a second motor 9. The first motor 8 and the second motor 9 are typically electric motors, which can be used as motor/generator. The configuration of the powertrain 1 according to the invention comprises that the crank axle 2 is connected to the ring gear 7, the first motor 8 is connected to the sun gear 5 and the second motor 9 is directly connected to the output axle 3. The second motor 9 is directly connected to the output axle 3, i.e. there is no freewheel between the output axle 3 and the second motor. This is contrary to prior art powertrains in which there is a freewheel provided between the output shaft and one or both of the motors. The first and the second motor 8, 9 are connected to a battery 10. The torque provided by the sun gear 5 and the torque provided by the ring gear 7 have the same operational direction, in this figure marked with a "+", while the planet carrier 6 provides the counter torque in opposite direction, designated with a "−" in its turn for driving the output shaft 3. When all planetary gear shafts rotate in the same direction, the power delivered on each of the shafts has the same operational orientation as the corresponding torque. For example, the power delivered on one of the shafts is positive when the corresponding torque has a positive operational direction and the corresponding rotational direction of the corresponding shaft is positive. As such, there are no serial losses, and optimal use is made of the planetary gear system. The second motor 9 directly contributes to the assistance of the cyclist by delivering power to the output shaft 3 directly.

Figure 2:
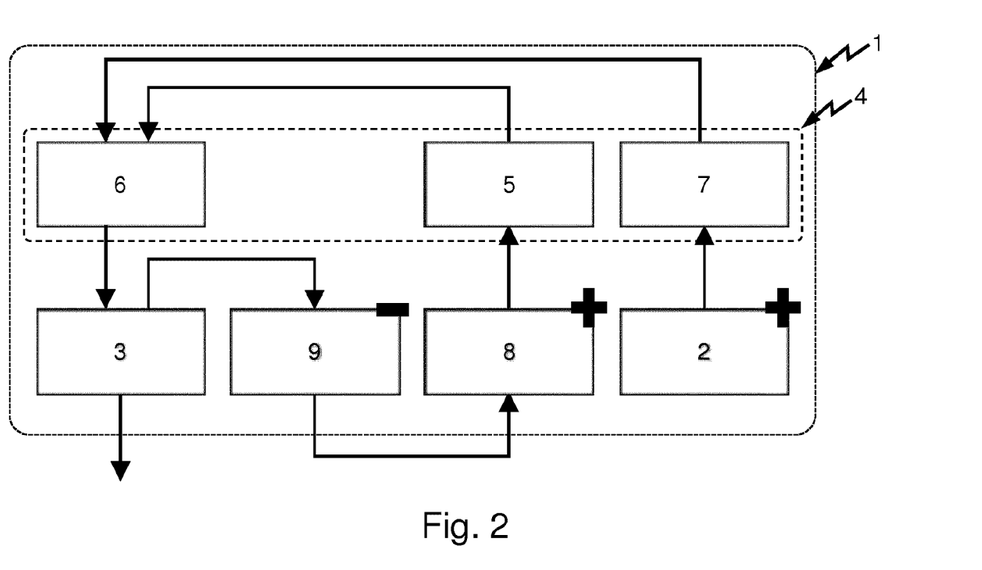
FIG. 2 shows a schematic arrangement of the powertrain of FIG. 1 indicating power paths with an empty battery.
Figure 3:
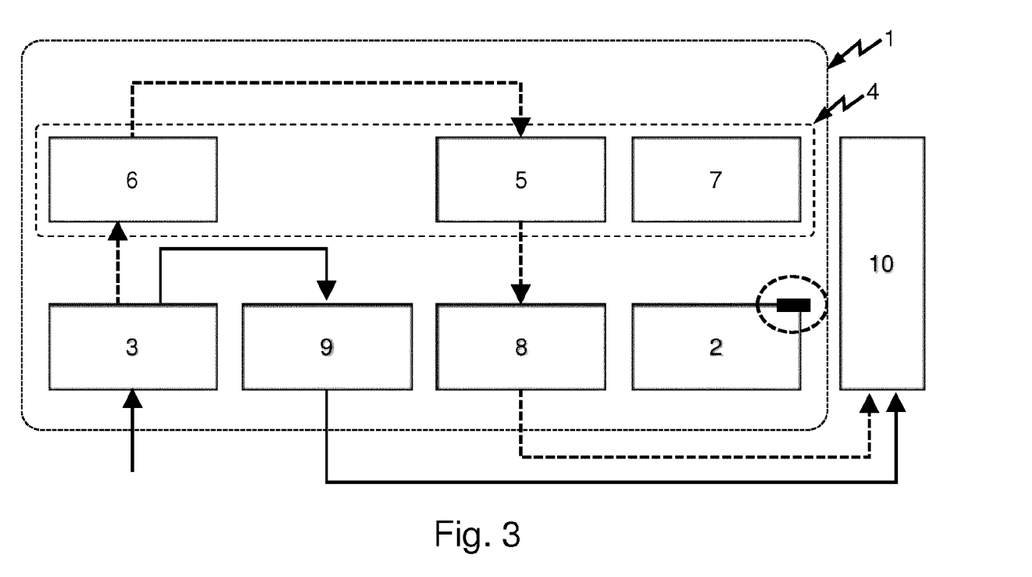
FIG. 3 shows a schematic arrangement of the powertrain of FIG. 1 indicating power paths for regenerative braking.

During cruising the battery 10 charges both the first motor 8 and the second motor 9. However, in case of an empty battery 10, as shown in FIG. 2, the cyclist 2 delivers power to the planetary gear set 4. The second motor 9, as it is rigidly connected to the output axle 3, runs along with the output axle 3. The power the second motor 9 there takes, can be fed to the first motor 8. Here, the second motor 9 then works as a generator, allowing some serial losses due to the direct connection between the second motor 9 and the first motor 8 in this situation. However, due to the absence of a clutch, between the sun 5 and a housing of the powertrain 1 or between the ring gear 7 and the planet carrier 6, the first motor 8 is preferably powered at all times to avoid slipping through of the cyclist in case of an empty battery. Also, due to the direct connection of the second motor 9 with the output axle 3, and due to the absence of a freewheel between the cyclist input 2 and the ring gear 7, regenerative braking becomes possible, as shown in FIG. 3. In the embodiment of FIG. 3, the second motor 9 provides for charging of the battery 10 with excess brake energy received on the output axle 3. The excess brake energy can thus be transmitted from the output axle 3 via the second motor 9 to the battery 10 to charge the battery 10. Charging of the battery 10 with the second motor 9 is already possible when the pedals are kept stationary, so at a stationary position of the crank axle 3. When the cyclist further provides for a negative torque on the crank axle, and thus ring gear, regenerative braking via the first motor 8 becomes possible as well.

Figure 4:
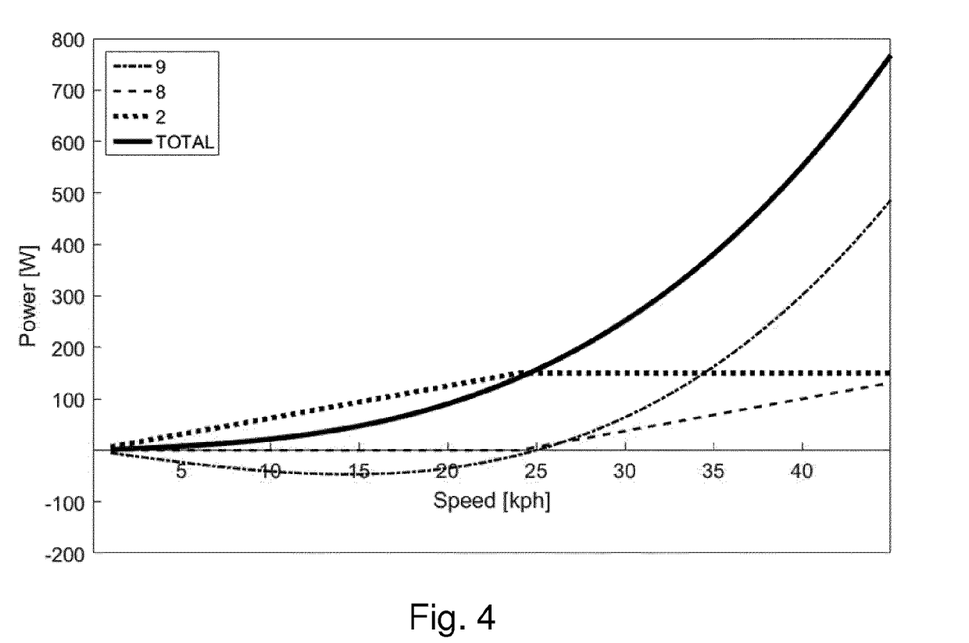
FIG. 4 shows a schematic of power assistance during cruising.

FIG. 4 shows a schematic diagram of possible power assistance during cruising. The relation between the power of the user and the first motor is fixed for each vehicle speed and crank speed, in view of the planetary gear set relation. So, an operating condition can be selected in which the sum of user input and the corresponding first motor input are approximately equal to the vehicle resistance. For a bicycle, these values could be set for example at 100 W cyclist input power at 25 kph nominal speed with 70 rpm cranking cadence and 156 W bicycle loss. In this example, the power of the first motor is thus about 56 W at 25 kph and 70 rpm cadence to avoid that the second motor will work in generator mode during this minimal cruising condition. Advantageously, the different ratios of the powertrain are dimensioned in such a way that the first motor and second motor run at an optimum maximum rpm or speed, e.g. 4500 rpm in a loading condition. Moreover, the powertrain ratios are preferably dimensioned to optimize the load distribution of the different power sources in order to increase efficiency. In this example, with a nominal cruising speed set a 25 kph, with a typical cyclist input of 100 W at 70 rpm cadence, it can be seen that the second motor is dimensioned to start to deliver power at the cruising speed of 25 kph. At a lower speed, the second motor contributes slightly negative power, and thus works, although limited, in a generator mode. For different nominal speeds, different dimensioning of the first motor and the second motor can be done. Advantageously, the dimensioning of the first motor is such that the maximum counter torque is achieved for the pedal force at standstill. Advantageously, the dimensioning of the second motor is such that the second motor provides sufficient power at maximum speed. In the above example, the first motor and the second motor can be motor of an installed power of e.g. 500 W. So, the total installed electric power is about e.g. 1000 W.

Figure 5:
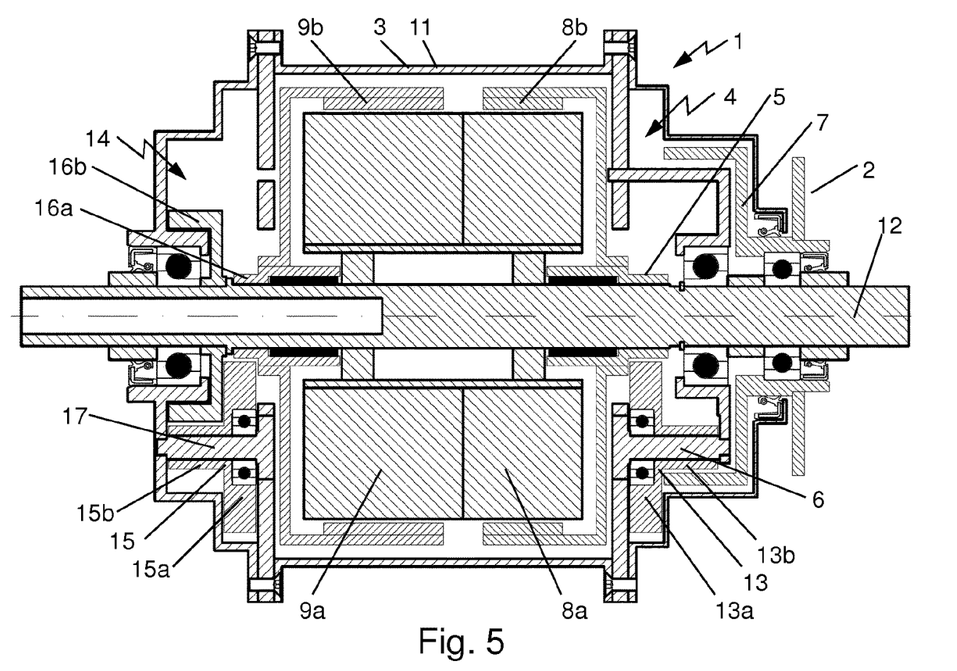
FIG. 5 shows a schematic representation of an embodiment of the powertrain of FIG. 1 in which the first motor and the second motor are positioned in the pedal-driven hub.
Figure 6:
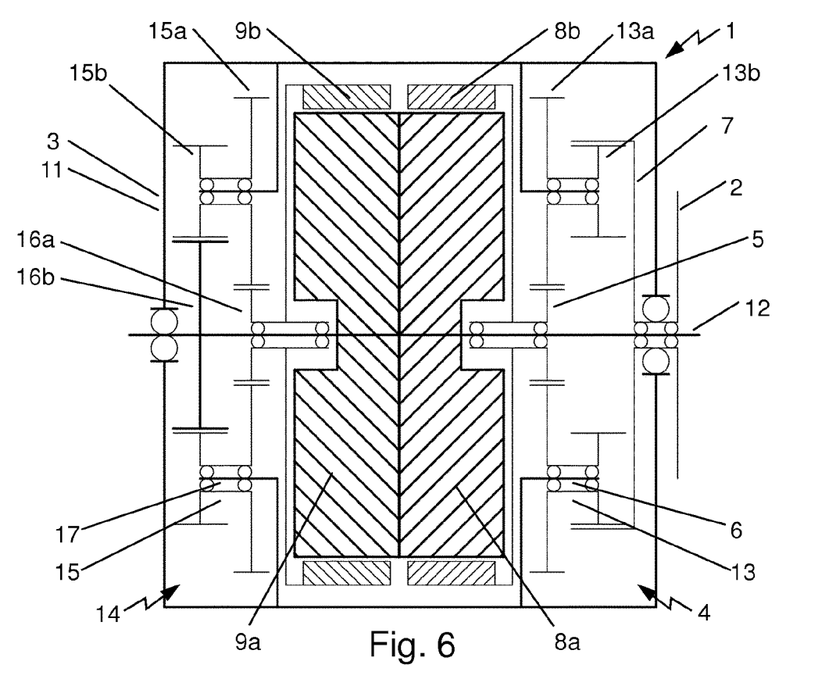
FIG. 6 shows a schematic diagram representation of the embodiment of FIG. 5.
Figure 7:
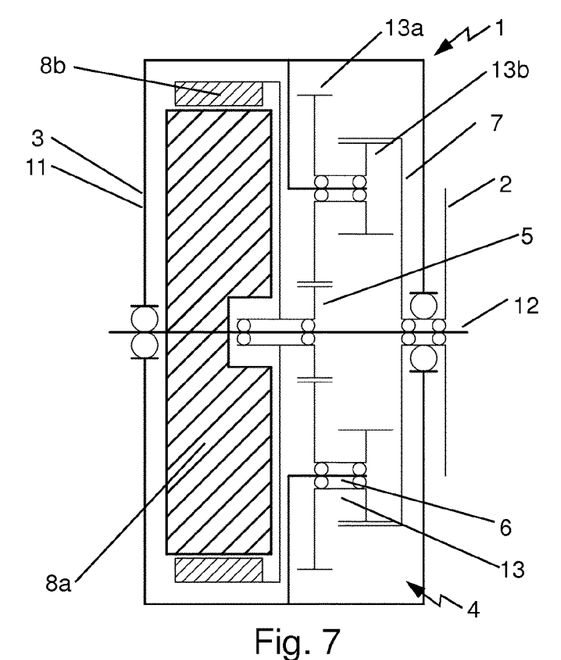
FIG. 7 shows a schematic diagram representation of an alternative embodiment.

FIG. 5 and FIG. 6 schematically show an embodiment in which both motors 8, 9 are provided on the pedal-driven hub housing 11. A hub shaft 12 goes through the hub housing 11. The first motor 8 and the second motor 9 are mounted onto the hub shaft 12. The first motor 8 has a stator part 8a and a rotor part 8b, and the second motor 9 has a stator part 9a and a rotor part 9b. The first motor stator 8a and the second motor stator 9a are connected to the hub shaft 12. The sun wheel 5 is connected to the first motor rotor 8b. A planet wheel 13 is rotatably coupled to the sun wheel 5 and supported by the planet carrier 6. Advantageously, the planet gear set 4 is a two-stage planet gear set 4, or compound planetary gear set 4, as shown in FIG. 5, 6 or 7. The compound planet wheel 13 can then be provided comprising a first planet wheel 13a having a first diameter that is coupled to the sun wheel 5 and comprising a second planet wheel 13b having a second diameter that is coupled to the ring wheel 7. The second diameter is advantageously smaller than the first diameter, this allows for a larger reduction ratio than can be obtained with a single stage planetary gear set.

The planet carrier 6 is fixedly connected to the hub housing 11, thereby forming the output 3 of the powertrain 1. The ring wheel 7 is rotatably coupled to the planet wheel 13 and is connected to the input 2 of the powertrain 1. The input 2 is here a belt pulley or a chain sprocket for receiving the cyclist input from the pedals mounted to a crank. At the other side of the hub housing 11, the second motor rotor 9b is connected to the hub housing 11, as output 3, with a gear reduction 14 between the second motor 9 and the hub housing 11. The gear reduction 14 is optional, but preferable for reducing the relatively high motor rpm to a lower output speed to e.g. the hub. The gear reduction 14 is here formed by a first sun gear 16a that is connected to second motor rotor 9b, and a planetary gear 15 that is rotatable coupled to the first gear 16a at one end and engaged with a second fixed sun gear 16b at an other end. The planetary gear 15 is supported by a planet carrier 17 that is fixedly connected to the hub housing 11, as output 3. Here, the gear reduction 14 is embodied as a compound gear reduction in which the planet gear 15 comprises a first planet gear 15a that is coupled to the first sun gear 16a having a first diameter and comprises a second planet gear 15b that is coupled to the second fixed sun gear 16b having a second diameter. To obtain an advantageous reduction ratio, the first diameter of the first planet gear 15a is smaller than the second diameter of the second planet gear 15b. So, the second motor 9 is here connected to the output 3 via the gear reduction 14 in order to provide a reduction from the rpm of the second motor 9 to a speed of the output 3, e.g. the hub housing 11, which typically runs at a lower speed than the motor rpm.

FIG. 7 shows an alternative embodiment of the powertrain 1. Here, the first motor 8 is positioned at the pedal-driven hub housing 11. The second motor 9 can be positioned elsewhere, for example at the non-pedal driven hub, or at the frame.

Figure 9A:
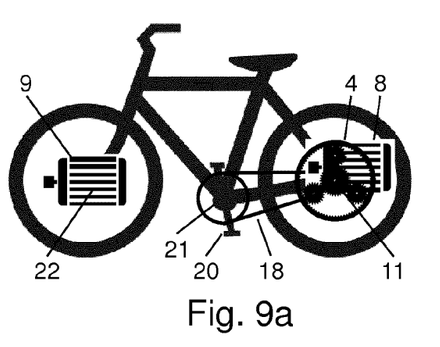
FIGS. 9a-9e show various embodiments of possible built-in locations for a powertrain.
Figure 9B:
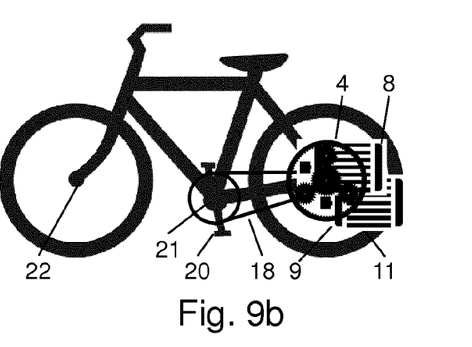
Figure 9C:
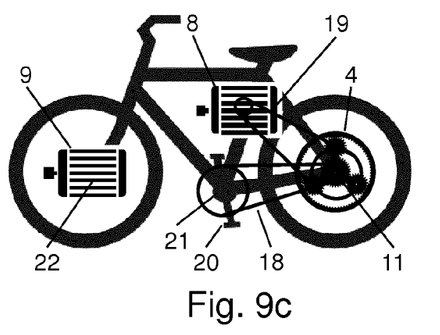
Figure 9D:
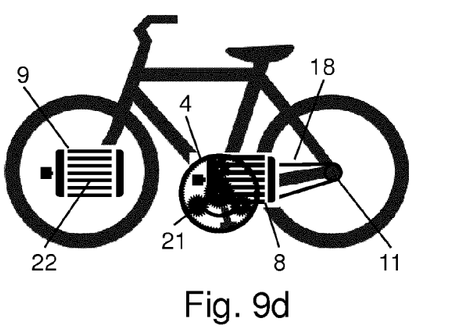
Figure 9E:
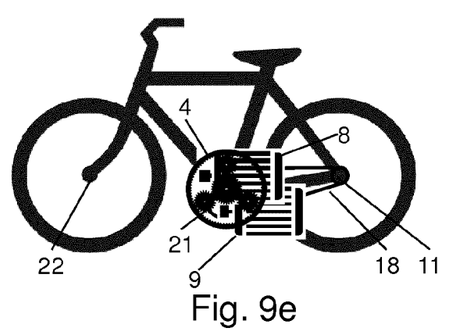

FIGS. 9a-9e show possible embodiments of configurations of the powertrain 1. FIG. 9a shows the first motor 8 and the planetary gear set 4 at the pedal-driven rear hub 11, and the second motor 9 at the non-pedal driven front wheel hub 22. The input from the cyclist via pedals 20 mounted to a crank 21 is received on the rear hub 11 via a chain or belt 18. FIG. 9b shows the first motor 8 and the second motor 9, as well as the planetary gear set 4 at the pedal-driven rear hub 11. FIG. 9c shows the first motor 8 positioned at the frame of the bicycle, the planetary gear set is positioned at the pedal-driven rear hub 11, and the second motor 9 is positioned at the non-pedal driven front hub 22. The first motor 8 can then be connected to the planetary gear set 4 via an additional chain or belt 19. In the embodiment of FIG. 9d the first motor 8 and the planetary gear set 4 are both positioned at the crank. Thus, the cyclist input can be directly received from the crank 21, the output of the powertrain 1 can then be transmitted to, here, the rear wheel, via a chain or belt 18. In the embodiment of FIG. 9e, the powertrain 1 is positioned at the crank 21.

With respect to the embodiment of FIG. 7, the first motor stator 8a is connected to the hub shaft 12 on which the hub housing 11 is rotatable mounted. The first motor rotor 8b is connected to the sun gear 5, which is rotatable connected to the planet gear 13. The planet carrier 6 supports the planet gear 13 and is fixedly connected to the hub housing 11, forming the output 3 for driving a wheel connected to the hub housing 11. The cyclist input 2 is received via a belt or chain to the ring gear 7.

Figure 8:
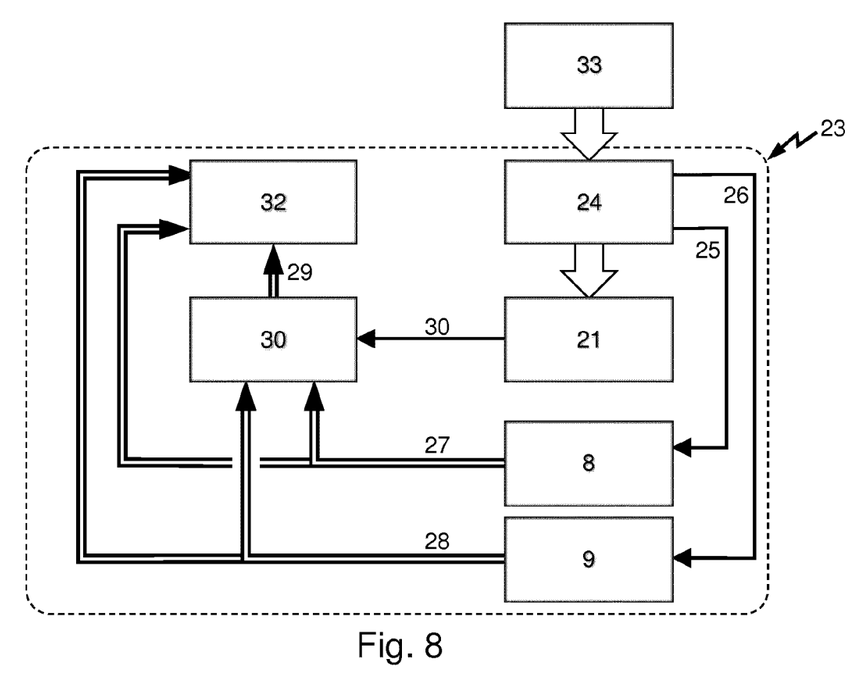
FIG. 8 shows a schematic representation of a control unit for controlling a powertrain according to the invention.

FIG. 8 shows an embodiment of a control unit 23 for controlling a powertrain 1 as described for example in relation to the previous figures. The control unit 23 comprises a controller 24 that is configured to provide the first motor 8 and the second motor 9 with input signals. The first motor 8 is speed controlled, whereas the second motor 9 is torque controlled. The control signal 25 for the first motor 8 is a speed control signal, and the control signal 26 for the second motor 9 is a torque control signal. From the first motor 8, and the second motor 9, the speed and the torque of the motors 8, 9 is known, and is provided as a combined speed and torque signal 27 and a combined speed and torque signal 28 respectively. The controller 24 may receive information on the speed and torque of the first motor 8 and, optionally, on the speed and torque of the second motor 9, as well as on the crank axle input such as combined position, speed and torque input signal 29. The crank axle input signal 29 is calculated by a calculator 30 based on at least the speed and torque signal 27 of the first motor 8 and on the crank axle position signal 31. The position of the crank axle 21 can for example be measured by means of a crank axle position sensor. The combined speed and torque signal 27 and the combined speed and torque signal 28, as well as the calculated crank input signal 29 can be stored in a memory 32 from which these signals can be inputted to the controller 24. By storing these signals 27, 28 and/or 29 the controller 24 may also use the time history of these signals for providing input to the first motor 8 and/or the second motor 9. The controller 24 is then configured to provide a speed control signal 25 for the first motor 8 and a torque control signal 26 for the second motor 9 to control the crank axle speed or the crank axle position.

Further, the controller 24 may receive input from a user interface 33. On the user interface, the user may give input as to the preferred crank speed during cruising, or the preferred assistance level during cruising and/or climbing etc. The user interface may be embodied as an interface on the vehicle itself, e.g. using a mechanical input device on which the user can select a preferred setting, e.g. by adjusting a lever, or using a digital input device, e.g. with a touch screen, or can be a remote input device that can be embodied as an application on a mobile communication device.

Further, the control unit 23 can be configured to run in the so-called climbing boost-mode, to control the power of the first motor proportional to the crank axle torque, at maximum speed of the first motor and at a standstill crank axle input. In such a climbing boost mode, the crank axle is stationary, i.e. the pedals are kept approximately standstill by the user, but the user can apply torque to the pedals and thus to the crank axle. The first motor 8 then may run at maximum speed and the second motor 9 at a relatively low speed, which is in accordance with the vehicle speed, because the second motor 9 is directly connected to the output shaft of the powertrain 1 and as such, with the vehicle. In this climbing boost mode, the controller 24 may target a crank position set point instead of a crank speed set point, because the crank position remains approximately stationary. The climbing boost mode can in particular be advantageous for steep uphill climbing, in which the cyclist almost cannot propel the vehicle forward, but can still give torque input onto the pedals. For mild uphill gradients, the controller 24 may allow the first motor 8 to run with negative speed, while the cyclist can still provide input power, and thus propel the vehicle also, at very low speed. The second motor 9 can then provide assistance to the cyclist. This mode only works in moderate or mild uphill gradients as the first motor is in fact working as a generator, thereby impairing the total system output.

For the purpose of clarity and a concise description, features are described herein as part of the same or separate embodiments, however, it will be appreciated that the scope of the invention may include embodiments having combinations of all or some of the features described. It may be understood that the embodiments shown have the same or similar components, apart from where they are described as being different.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage. Many variants will be apparent to the person skilled in the art. All variants are understood to be comprised within the scope of the invention defined in the following claims.

The invention claimed is:

1. A powertrain for a bicycle, the powertrain comprising:
   a first electric motor;
   a second electric motor; and
   a planetary gear set comprising a sun gear, a ring gear, and a planet carrier,
   wherein the sun gear is connected to the first electric motor, the ring gear is configured to be connected to a crank axle of the bicycle that receives a user input, and the planet carrier is configured to be connected to an output of a powertrain for transmitting power to a wheel of the bicycle,
   wherein the second electric motor is configured to be coupled, without an intervening freewheel or clutch, to a hub of a non-pedal-driven wheel of the bicycle.

2. The powertrain according to claim 1, further comprising a control unit that is configured to provide control signals to the first electric motor and/or to the second electric motor based on a crank axle input.

3. The powertrain according to claim 2, wherein the control unit is configured to run in a climbing boost mode to control the power of the first electric motor proportional to the crank axle torque, at maximized speed of the first electric motor and at a standstill crank axle input.

4. The powertrain according to claim 1, further comprising a battery coupled to the first electric motor and the second electric motor.

5. The powertrain according to claim 4, wherein the second electric motor is arranged to charge the battery with brake energy received from the output of the powertrain.

6. The powertrain according to claim 5, wherein the first electric motor is arranged to charge the battery with additional brake energy on the output of the powertrain proportional to the crank axle torque.

7. The powertrain according to claim 1, wherein the powertrain is configured to provide a park position of the crank axle.

8. The powertrain according to claim 7, wherein the pedals in the park position are positioned respectively in a quadrant before a dead point of the pedal cycle.

9. The powertrain according to claim 7, wherein the control unit is configured to bring the pedals to the park positions.

10. The powertrain according to claim 1, wherein the planetary gear set and the first electric motor are arranged in a pedal-driven wheel hub of the bicycle.

11. The powertrain according to claim 1, wherein the powertrain is dimensioned such that above a predetermined vehicle load, the second electric motor generates positive power for assistance to the user.

12. The powertrain according to claim 1, wherein the second electric motor is configured to be coupled, without an intervening freewheel or clutch, to a hub of a front wheel of the bicycle, the front wheel being the non-pedal-driven wheel of the bicycle.

13. The powertrain according to claim 1, wherein the planet carrier is configured to be connected to an output of the powertrain for transmitting power to the back wheel of the bicycle.

14. A bicycle comprising a powertrain, wherein the powertrain includes
   a first electric motor;
   a second electric motor; and
   a planetary gear set comprising a sun gear, a ring gear, and a planet carrier,
   wherein the sun gear is connected to the first electric motor, the ring gear is connected to a crank axle of the bicycle that receives a user input, and the planet carrier is connected to an output of a powertrain for transmitting power to a wheel of the bicycle, and
   wherein the second motor is coupled, without an intervening freewheel or clutch, to a hub of a non-pedal-driven wheel of the bicycle.

* * * * *